US012722491B2

(12) United States Patent
Yamamoto

(10) Patent No.: US 12,722,491 B2
(45) Date of Patent: Sep. 1, 2026

(54) DISPLAY DEVICE

(71) Applicants: TOYOTA JIDOSHA KABUSHIKI KAISHA, Aichi (JP); DENSO CORPORATION, Aichi (JP)

(72) Inventor: Yuki Yamamoto, Toyota (JP)

(73) Assignees: TOYOTA JIDOSHA KABUSHIKI KAISHA, Aichi (JP); DENSO CORPORATION, Aichi (JP)

( * ) Notice: Subject to any disclaimer, the term of this patent is extended or adjusted under 35 U.S.C. 154(b) by 29 days.

(21) Appl. No.: 18/817,239

(22) Filed: Aug. 28, 2024

(65) Prior Publication Data

US 2025/0074194 A1 Mar. 6, 2025

(30) Foreign Application Priority Data

Sep. 5, 2023 (JP) ................................ 2023-143516

(51) Int. Cl.
*B60K 35/29* (2024.01)
*B60K 35/22* (2024.01)
(Continued)

(52) U.S. Cl.
CPC .............. *B60K 35/29* (2024.01); *B60K 35/22* (2024.01); *B60K 35/28* (2024.01); *B60K 35/81* (2024.01);
(Continued)

(58) Field of Classification Search
CPC ........ B60K 35/29; B60K 35/22; B60K 35/28; B60K 35/81; B60K 2360/175; B60K 2360/176; B60K 2360/179; B60K 2360/1868; B60K 2360/1876; B60K 2360/21
See application file for complete search history.

(56) References Cited

U.S. PATENT DOCUMENTS 9,969,261 B2 5/2018 Kodama
10,045,173 B1 8/2018 Morimura et al.
(Continued)

FOREIGN PATENT DOCUMENTS

JP 2012-071832 A 4/2012
WO WO-2019091840 A1 * 5/2019 ........... G06F 3/0487

OTHER PUBLICATIONS

Machine translation for WO2019091840A1 (Year: 2019).*

*Primary Examiner* — Scott A Browne
*Assistant Examiner* — Lidia Kwiatkowska
(74) *Attorney, Agent, or Firm* — HAUPTMAN HAM, LLP

(57) ABSTRACT

A display device including: a road width recognition unit configured to recognize a width of a road on which a vehicle is traveling based on a detection result of a vehicle-mounted external sensor used for at least one of autonomous driving control and driving assistance control of the vehicle including a camera, the camera being configured to capture a surrounding situation image showing a situation around the vehicle; and a display control unit configured to cause a vehicle-mounted display unit to display the surrounding situation image. The display control unit is configured to cause the display unit to display the surrounding situation image when a vehicle speed of the vehicle is equal to or less than a predetermined vehicle speed threshold and a predetermined narrow path condition is satisfied, based on at least the width of the road and the vehicle speed.

3 Claims, 4 Drawing Sheets

(51) Int. Cl.
*B60K 35/28* (2024.01)
*B60K 35/81* (2024.01)

(52) U.S. Cl.
CPC .. *B60K 2360/175* (2024.01); *B60K 2360/176* (2024.01); *B60K 2360/179* (2024.01); *B60K 2360/1868* (2024.01); *B60K 2360/1876* (2024.01); *B60K 2360/21* (2024.01)

(56) References Cited

U.S. PATENT DOCUMENTS

| | | | | |
|---|---|---|---|---|
| 10,106,157 | B2 | 10/2018 | Sawada et al. | |
| 10,150,407 | B2 | 12/2018 | Takahashi et al. | |
| 10,696,297 | B2 | 6/2020 | Nguyen Van et al. | |
| 11,001,255 | B2 | 5/2021 | Fukuman et al. | |
| 11,110,937 | B2 | 9/2021 | Kinoshita et al. | |
| 2019/0001968 | A1 | 1/2019 | Yorifuji et al. | |
| 2019/0344828 | A1 | 11/2019 | Omori et al. | |
| 2019/0389488 | A1 | 12/2019 | Yamada et al. | |
| 2020/0094875 | A1* | 3/2020 | Mimura | B60K 35/60 |
| 2023/0142656 | A1* | 5/2023 | Suzuki | B62D 6/008 340/438 |
| 2023/0227025 | A1* | 7/2023 | Kuramochi | B60W 30/09 701/301 |
| 2023/0406316 | A1* | 12/2023 | Kume | B60K 35/22 |

* cited by examiner 1
2
100
DISPLAY CONTROL ECU
10
SURROUNDING SITUATION RECOGNITION UNIT
11
TRAVELING STATE RECOGNITION UNIT
12
ROAD WIDTH RECOGNITION UNIT
13
OCCUPANT STATE RECOGNITION UNIT
14
DISPLAY CONTROL UNIT
15
IN-VEHICLE CAMERA
16
DISPLAY
17
AUTONOMOUS DRIVING ECU
20
EXTERNAL SENSOR
21
MAP DATABASE
22
INTERNAL SENSOR
23
GNSS RECEIVER
24
ACTUATOR
25

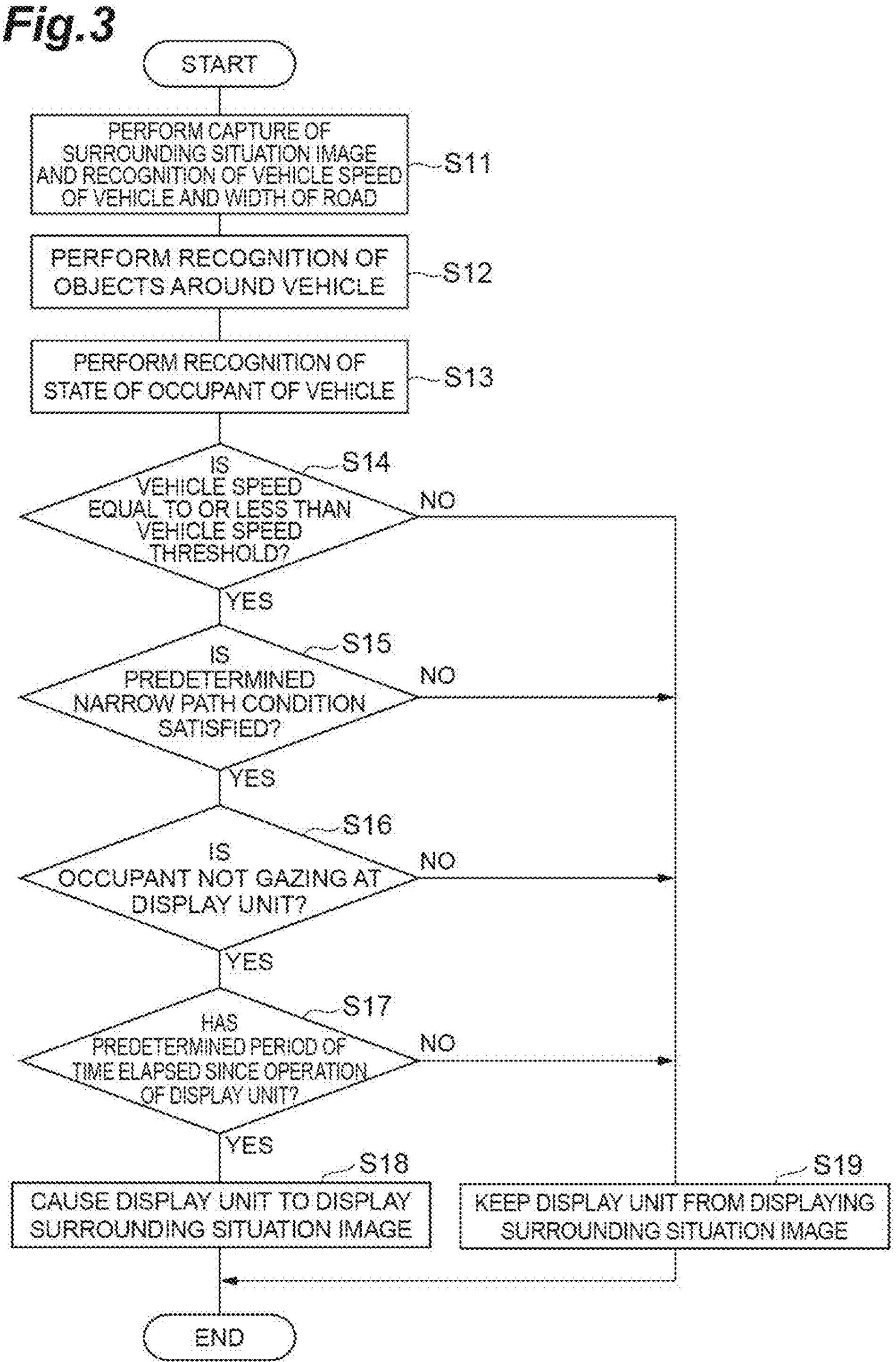
Fig.3
START
PERFORM CAPTURE OF SURROUNDING SITUATION IMAGE AND RECOGNITION OF VEHICLE SPEED OF VEHICLE AND WIDTH OF ROAD
S11
PERFORM RECOGNITION OF OBJECTS AROUND VEHICLE
S12
PERFORM RECOGNITION OF STATE OF OCCUPANT OF VEHICLE
S13
IS VEHICLE SPEED EQUAL TO OR LESS THAN VEHICLE SPEED THRESHOLD?
S14
NO
YES
IS PREDETERMINED NARROW PATH CONDITION SATISFIED?
S15
NO
YES
IS OCCUPANT NOT GAZING AT DISPLAY UNIT?
S16
NO
YES
HAS PREDETERMINED PERIOD OF TIME ELAPSED SINCE OPERATION OF DISPLAY UNIT?
S17
NO
YES
CAUSE DISPLAY UNIT TO DISPLAY SURROUNDING SITUATION IMAGE
S18
KEEP DISPLAY UNIT FROM DISPLAYING SURROUNDING SITUATION IMAGE
S19
END

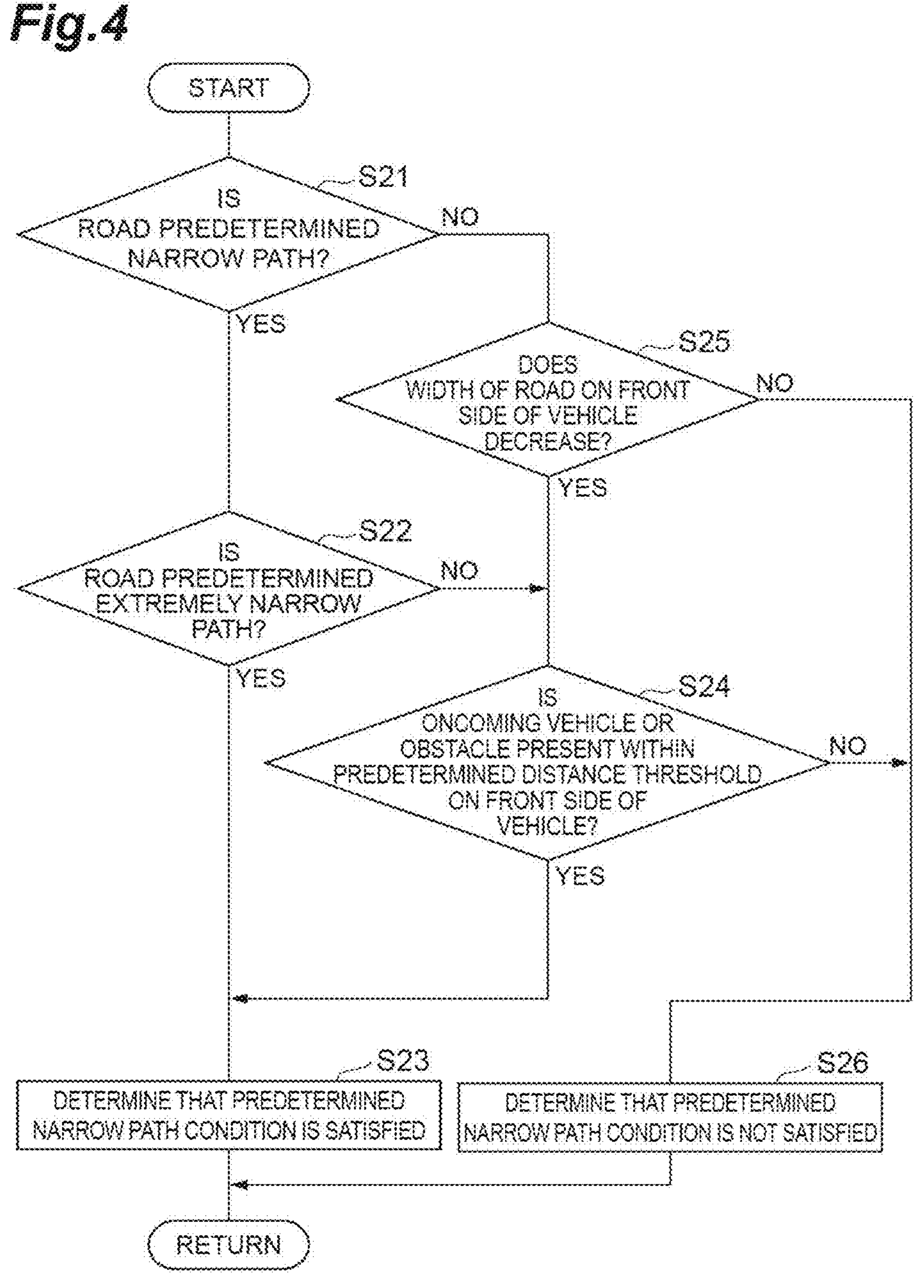
Fig.4
START
S21
IS ROAD PREDETERMINED NARROW PATH?
NO
YES
S25
DOES WIDTH OF ROAD ON FRONT SIDE OF VEHICLE DECREASE?
NO
YES
S22
IS ROAD PREDETERMINED EXTREMELY NARROW PATH?
NO
YES
S24
IS ONCOMING VEHICLE OR OBSTACLE PRESENT WITHIN PREDETERMINED DISTANCE THRESHOLD ON FRONT SIDE OF VEHICLE?
NO
YES
S23
DETERMINE THAT PREDETERMINED NARROW PATH CONDITION IS SATISFIED
S26
DETERMINE THAT PREDETERMINED NARROW PATH CONDITION IS NOT SATISFIED
RETURN

DISPLAY DEVICE

CROSS-REFERENCE TO RELATED APPLICATION

This application claims the benefit of priority from Japanese Patent Application No. 2023-143516, filed on Sep. 5, 2023, the entire contents of which are incorporated herein by reference.

TECHNICAL FIELD

The present disclosure relates to a display device.

BACKGROUND

Thus far, a technology in which road map information around the current position of a vehicle acquired by a navigation device is used to determine whether the vehicle is approaching or entering a narrow path or a bent path and the videos are switched according to the determination result has been known (for example, Japanese Unexamined Patent Publication No. 2012-071832).

In the above conventional technology, road map information around the current position of the vehicle acquired by a navigation device is mainly used. Therefore, the determination result is likely to be influenced by the accuracy of the current position of the vehicle and the presence or absence of road map information. As a result, the switching of the videos may not be appropriately performed.

SUMMARY

A display device according to an aspect of the present disclosure includes: a road width recognition unit configured to recognize a width of a road on which a vehicle is traveling based on a detection result of a vehicle-mounted external sensor used for at least one of autonomous driving control and driving assistance control of the vehicle including a camera, the camera being configured to capture a surrounding situation image showing a situation around the vehicle; and a display control unit configured to cause a vehicle-mounted display unit to display a surrounding situation image, in which the display control unit is configured to cause the display unit to display a surrounding situation image when a vehicle speed of the vehicle is equal to or less than a predetermined vehicle speed threshold and a predetermined narrow path condition is satisfied, based on at least the width of the road and the vehicle speed.

The display device according to an aspect of the present disclosure causes the display unit to display a surrounding situation image when the vehicle speed is equal to or less than a predetermined vehicle speed threshold and a predetermined narrow path condition is satisfied. The predetermined narrow path condition is satisfied according to the width of the road recognized based on the detection result of a vehicle-mounted external sensor used for at least one of autonomous driving control and driving assistance control of the vehicle. Whether the predetermined narrow path condition is satisfied or not is determined using the width of the road recognized more directly. Therefore, a surrounding situation image can be automatically displayed on the display unit in a more appropriate situation than when, for example, map information of a navigation device is mainly used.

In an embodiment, the display device includes a surrounding object recognition unit configured to recognize an object around the vehicle based on the detection result of the external sensor, and the narrow path condition may be satisfied when the road is a predetermined extremely narrow path or when the road is a predetermined narrow path wider than the predetermined extremely narrow path and at least one of an oncoming vehicle and an obstacle is present within a predetermined distance threshold on the front side of the vehicle.

In an embodiment, the display device includes a surrounding object recognition unit configured to recognize an object around the vehicle based on the detection result of the external sensor, and the narrow path condition may be satisfied when the road is wider than a predetermined narrow path, the width of the road on the front side of the vehicle decreases, and at least one of an oncoming vehicle and an obstacle is present within a predetermined distance threshold on the front side of the vehicle.

In an embodiment, the display device includes an occupant state recognition unit configured to recognize the state of an occupant of the vehicle based on a captured image of an in-vehicle camera configured to capture an image of the occupant of the vehicle, and the display control unit may be configured to keep the display unit from displaying a surrounding situation image when the occupant is gazing at the display unit when the vehicle speed is equal to or less than the predetermined vehicle speed threshold and the predetermined narrow path condition is satisfied.

According to some aspects of the present disclosure, a surrounding situation image can be automatically displayed on the display unit in a more appropriate situation than when, for example, map information of a navigation device is mainly used.

BRIEF DESCRIPTION OF THE DRAWINGS

FIG. 3 is a flowchart showing a processing example of a display control ECU of the display device.

FIG. 4 is a flowchart showing an example of narrow path condition determination processing of FIG. 3.

DETAILED DESCRIPTION

Figure 1:
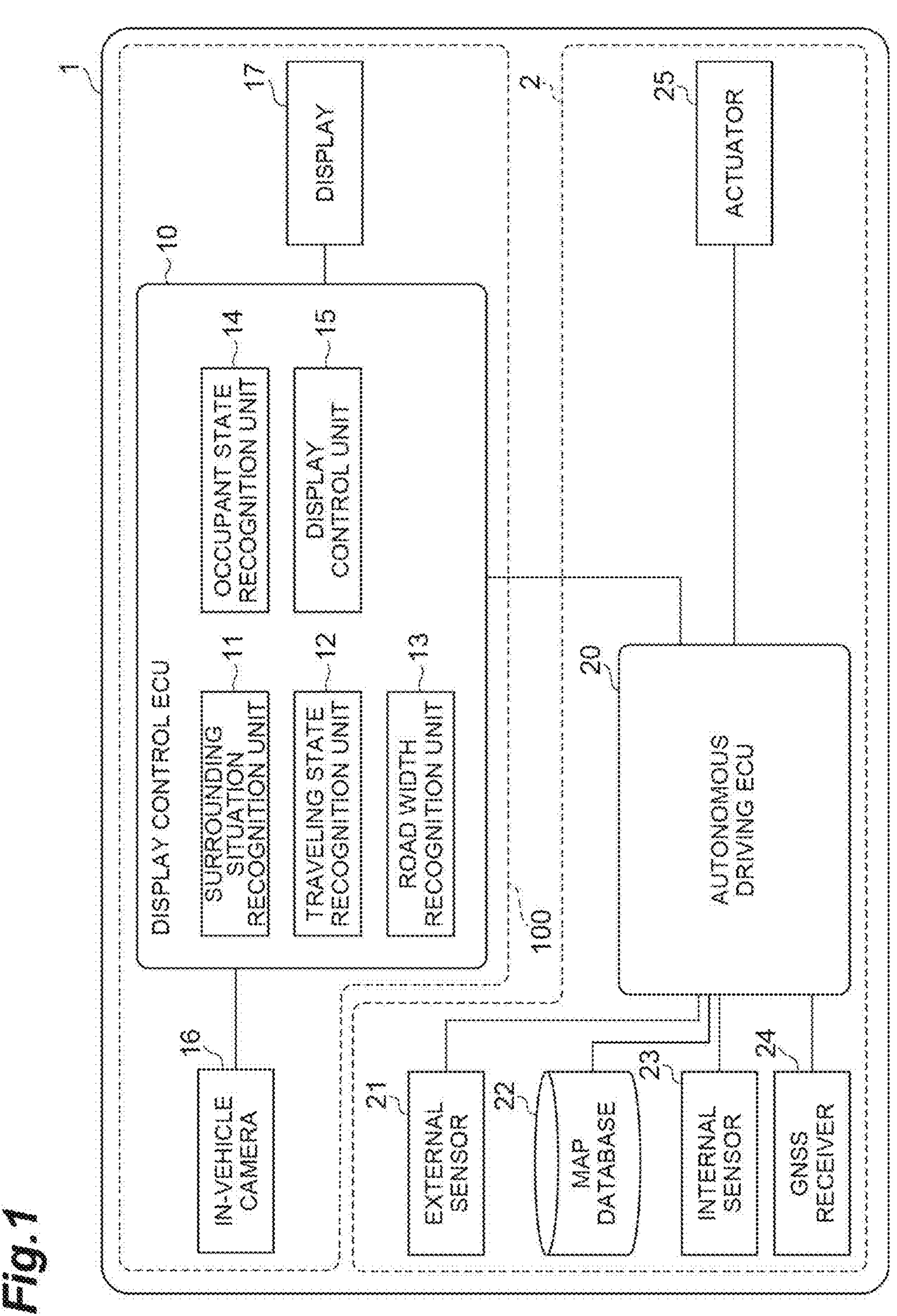
FIG. 1 is a block diagram showing a vehicle including a display device according to an embodiment.

Hereinbelow, embodiments of the present disclosure are described with reference to the drawings. In the following description, the same or corresponding elements are denoted by the same reference numerals, and a repeated description is omitted.

FIG. 1 is a block diagram showing a vehicle including a display device according to an embodiment. As shown in FIG. 1, a display device 100 is mounted on a vehicle 1 capable of executing autonomous driving control. The vehicle 1 is, for example, a passenger car or the like.

[Configuration of Autonomous Driving System]

The vehicle 1 is equipped with an autonomous driving system 2. The autonomous driving system 2 is a system that executes autonomous driving control of the vehicle 1. The autonomous driving control is vehicle control that, without a driver performing a driving operation, causes the vehicle 1 to automatically travel along the road on which the vehicle 1 is to travel. The autonomous driving control executable by the vehicle 1 includes autonomous driving control in which the driver is required to visually confirm surroundings. Autonomous driving control in which visual confirmation of the surrounding environment is required for the driver corresponds to autonomous driving control at a predetermined assist level in which driving responsibility is imposed on the driver, for example.

The autonomous driving system 2 includes an autonomous driving ECU (electronic control unit) 20, an external sensor 21, a map database 22, an internal sensor 23, a GNSS receiver 24, and an actuator 25.

The autonomous driving ECU 20 is an electronic control unit including a CPU (central processing unit), a ROM (read-only memory), a RAM (random-access memory), a CAN (controller area network) communication circuit, etc. The autonomous driving ECU 20 controls hardware based on signals outputted from the CPU, and achieves functions of the autonomous driving ECU 20 described later. As a more specific operation example, the autonomous driving ECU 20 operates the CAN communication circuit to input and output data, stores input data in the RAM, loads a program stored in the ROM to the RAM, and executes the program loaded in the RAM. The autonomous driving ECU 20 may be composed of a plurality of electronic units. Some of the functions of the autonomous driving ECU 20 may be executed by a server capable of communicating with the vehicle 1.

The external sensor 21 is a vehicle-mounted external sensor mainly used for autonomous driving control of the vehicle 1. The external sensor 21 includes at least a camera. The camera is an imaging device that captures an image of the external environment of the vehicle 1, including a surrounding situation image representing a situation around the vehicle 1. The camera is, for example, provided on the back side of the windshield of the vehicle 1.

The external sensor 21 may include a radar sensor. The radar sensor is a detection device that uses radio waves (for example, millimeter waves) or light to detect an object around the vehicle 1. The radar sensor includes, for example, a radar (millimeter wave radar) or a LiDAR (light detection and ranging). The external sensor 21 transmits detection information regarding an object around vehicle 1 to the autonomous driving ECU 20.

The map database 22 is a database that stores map information. The map database 22 is, for example, formed in a recording device such as an HDD (hard disk drive) mounted on the vehicle 1. The map information stored in the map database 22 includes, for example, road position information, road shape information (for example, curvature information), position information of intersections and junctions, etc. The map information stored in the map database 22 is mainly used for autonomous driving control of the vehicle 1. The map information stored in the map database 22 may include road width information and position information of road width reduction signs.

The internal sensor 23 is a vehicle-mounted sensor that detects the traveling state of the vehicle 1. The internal sensor 23 may include a vehicle speed sensor, an acceleration sensor, and a yaw rate sensor. Known sensors can be used as the vehicle speed sensor, the acceleration sensor, and the yaw rate sensor. The internal sensor 23 may detect, as vehicle information, water temperature information, amount-of-remaining-fuel information, shift position information, etc. of the vehicle 1. The internal sensor 23 transmits detection information regarding the traveling state of the vehicle 1 to the autonomous driving ECU 20.

The GNSS receiver 24 receives a signal from a positioning satellite, and thereby measures the position of the vehicle (for example, the latitude and longitude of the vehicle). The GNSS receiver 24 transmits the measured position information of the vehicle to the autonomous driving ECU 20.

The actuator 25 is a device used for driving control of the vehicle 1, and operates according to a control signal from the autonomous driving ECU 20. The actuator 25 includes at least a drive actuator, a brake actuator, and a steering actuator. The driving actuator is provided in, for example, an engine, a motor, or the like as a power source, and controls the driving force of the vehicle 1. The brake actuator is provided in, for example, a hydraulic brake system, and controls braking force applied to the wheels of the vehicle 1. The steering actuator is, for example, an assist motor of an electric power steering system, and controls the steering torque of the vehicle 1.

The autonomous driving ECU 20 is configured to recognize a vehicle position that is the position of the vehicle 1 on a map, the external environment of the vehicle 1, and the traveling state of the vehicle 1.

The autonomous driving ECU 20 recognizes the external environment around the vehicle 1 based on the detection result of the external sensor 21. The external environment includes the position of an object relative to the vehicle 1, the relative speed of an object relative to the vehicle 1, the moving direction of an object relative to the vehicle 1, etc. The external environment includes a lane line and a road shape recognized by lane line recognition processing from the detection result of the external sensor 21. The external environment includes the width of the road on which the vehicle 1 is traveling, recognized by lane line recognition processing and image recognition processing from the detection result of the external sensor 21. That is, the autonomous driving ECU 20 may function as a road width recognition unit.

The autonomous driving ECU 20 is configured to be able to acquire map information used for autonomous driving control. The autonomous driving ECU 20 acquires map information from the map database 22. The autonomous driving ECU 20 may acquire map information from a server capable of communicating with the vehicle 1 via a communication network. The autonomous driving ECU 20 may acquire road width information and position information of road width reduction signs, as map information.

The autonomous driving ECU 20 recognizes the traveling state of the vehicle 1 based on the detection result of the internal sensor 23. The traveling state includes the vehicle speed of the vehicle 1. The traveling state may include the acceleration of the vehicle 1 and the yaw rate of the vehicle 1.

The autonomous driving ECU 20 acquires, based on position information of the GNSS receiver 24 and map information, a vehicle position that is the position of the vehicle 1 on a map. The autonomous driving ECU 20 may recognize the vehicle position using SLAM (Simultaneous Localization and Mapping) technology.

The autonomous driving ECU 20 generates a traveling plan of the vehicle 1 based on the destination, map information, the vehicle position, the external environment, and the traveling state (the vehicle speed, the yaw rate, etc.). The destination may be a destination set by an occupant, including the driver, or a destination proposed by the autonomous driving system 2.

The autonomous driving ECU 20 executes autonomous driving control of the vehicle 1 based on the generated traveling plan. The autonomous driving ECU 20 transmits a control signal to the actuator 25, and thereby controls the vehicle speed and the steering angle of the vehicle 1 and executes autonomous driving control.

[Configuration of Display Device]

Next, a configuration of the display device 100 according to the present embodiment is described. The display device 100, under a predetermined condition, causes a vehicle-mounted display (display unit) 17 to display a surrounding situation image showing the situation around the vehicle 1. The display device 100 is mainly composed of a display control ECU 10, an in-vehicle camera 16, and a display 17, which are mounted on the vehicle 1. The display device 100 may acquire various types of information from the external sensor 21, the map database 22, the internal sensor 23, and the GNSS receiver 24 via the autonomous driving ECU 20.

The display control ECU 10 is an electronic control unit (computer) including a CPU, a ROM, a RAM, a CAN communication circuit, etc. The display control ECU 10 controls the display 17. The display control ECU 10 may be an electronic control unit built in the display 17. The display control ECU 10 may be a portion of the autonomous driving ECU 20. The display control ECU 10 may be composed of a plurality of electronic units. The display control ECU 10 is, for example, connected to the autonomous driving ECU 20 to be able to communicate therewith. Some of the functions of the display control ECU 10 may be executed by a server capable of communicating with the vehicle 1.

The in-vehicle camera 16 is an imaging device that captures an image of an occupant of the vehicle 1. The in-vehicle camera 16 is, for example, provided in a front seat portion in the vehicle interior of the vehicle 1. The in-vehicle camera 16 captures at least an image of the face of an occupant. A plurality of in-vehicle cameras 16 may be provided to capture images of an occupant from multiple directions. The in-vehicle camera 16 transmits imaging information of the occupant to the display control ECU 10.

The display 17 is a display that is mounted on the vehicle 1 and displays an image for the occupant. The image is displayed in a predetermined display area of the display 17. The display 17 is controlled by the display control ECU 10, and displays an image in the display area. As the display 17, a display capable of changing the size and the shape of figures, luminance, color, etc. of figures is used.

As an example of the display 17, a liquid crystal display for a navigation system is used. The display 17 may be a touch panel. A head-up display (HUD) may be used as the display 17. As the display 17, a liquid crystal display (also known as a multi-information display (MID)) provided on the front side of the driver of the instrument panel may be used.

Functions of the display control ECU 10 will now be described. As shown in FIG. 1, the display control ECU 10 includes, as functional configurations, a surrounding situation recognition unit (surrounding object recognition unit) 11, a traveling state recognition unit 12, a road width recognition unit 13, an occupant state recognition unit 14, and a display control unit 15.

The surrounding situation recognition unit 11 recognizes an object around the vehicle 1 based on the detection result of the external sensor 21. The object around the vehicle 1 herein includes an object that is present in the traveling direction of the road on which the vehicle 1 is traveling and increases the possibility of hindering smooth traveling of the vehicle 1 by occupying a certain dimension in the width direction of the road.

The surrounding situation recognition unit 11 uses, for example, the detection result of a camera or a radar sensor of the external sensor 21 to recognize at least one of an oncoming vehicle and an obstacle as an object around the vehicle 1. The surrounding situation recognition unit 11 recognizes whether at least one of an oncoming vehicle and an obstacle is present within a predetermined distance threshold on the front side of (in front of) the vehicle 1 or not. The predetermined distance threshold is a threshold of the distance from the vehicle 1 to at least one of an oncoming vehicle and an obstacle for determining whether to automatically display a surrounding situation image or not. The predetermined distance threshold can be, for example, such a distance (for example, about 20 m) that the vehicle 1 is hindered from smooth traveling due to at least one of an oncoming vehicle and an obstacle on the road on which the vehicle 1 is traveling.

The surrounding situation recognition unit 11 acquires a surrounding situation image captured by a camera of the external sensor 21. The surrounding situation image is a captured image showing a situation around (for example, the front side of) the vehicle 1, and is an image to be displayed on the display 17 and presented to the occupant. The surrounding situation image may include an image showing another vehicle such as a recognized oncoming vehicle. The surrounding situation image may include, for example, an image showing an object such as a recognized obstacle.

The surrounding situation recognition unit 11 herein can generate a surrounding situation image to be displayed on the display 17 based on the vehicle position of the vehicle 1, the external environment of the vehicle 1, the traveling state of the vehicle 1, the dimensional specifications of the vehicle 1, etc. recognized by the autonomous driving ECU 20. The surrounding situation recognition unit 11 can generate a surrounding situation image by, for example, a known method. The surrounding situation recognition unit 11 herein can use the detection result of the external sensor 21 via the autonomous driving ECU 20.

The traveling state recognition unit 12 uses the detection result of the internal sensor 23 to recognize the vehicle speed of vehicle 1. The traveling state recognition unit 12 herein can use the vehicle speed of the vehicle 1 via the autonomous driving ECU 20.

The road width recognition unit 13 uses the detection result of the external sensor 21 to recognize the width of the road on which the vehicle 1 is currently traveling. The road width recognition unit 13 can recognize the width of the road on which the vehicle 1 is currently traveling by a known method based on, for example, both end portions in the width direction of the road themselves and the interval between lane lines or curbs extending along the road in both end portions in the width direction of the road.

The road width recognition unit 13 may determine whether the width of the road on the front side of the vehicle 1 decreases or not. For example, the road width recognition unit 13 uses a result of recognition of objects around the vehicle 1, and when the result indicates that there is a width reduction sign on the front side of the vehicle 1, determines that the width of the road on the front side of the vehicle 1 decreases. The road width recognition unit 13 may, when map information that the width of the road on the front side of the vehicle 1 decreases is obtained based on map information of the map database 22 and the vehicle position of the vehicle 1, determine that the width of the road on the front side of the vehicle 1 decreases. The road width recognition unit 13 herein can use the detection result of the external sensor 21 and map information via the autonomous driving ECU 20.

The occupant state recognition unit 14 may recognize the occupant state of the vehicle 1 based on a captured image of the in-vehicle camera 16. The occupant state refers to the state of the occupant that is used as a basis for determining whether automatic display of surrounding situation images on the display 17 causes inconvenience to the occupant. As an example, the occupant state includes whether the occupant is gazing at the display 17 or not. As an example, the occupant state includes whether a predetermined period of time has elapsed since the occupant operated the display 17 or not.

The occupant state recognition unit 14 may, for example, acquire the face direction of the occupant by a known image processing method based on imaging information of the in-vehicle camera 16. The "face direction" means the direction in which the occupant's face itself is directed. The face direction of the occupant can be acquired by, for example, a known image processing method such as a method using the arrangement of the eyes, the nose, and the mouth in an area corresponding to the occupant's face in the captured image of the in-vehicle camera 16, or a pattern matching method.

The occupant state recognition unit 14 may acquire the line-of-sight direction of the occupant by using a captured image of the occupant captured with the in-vehicle camera 16. The "line-of-sight direction" means the direction in which the line of sight of the occupant is directed. The line-of-sight direction of the occupant can be acquired by, for example, a known image processing method such as a method using mutual positional relationships, etc. of a plurality of points set for the occupant's eyes in the captured image of the in-vehicle camera 16.

The occupant state recognition unit 14 can recognize whether the occupant is gazing at the display 17 or not based on the face direction and the line-of-sight direction of the occupant.

The occupant state recognition unit 14 may recognize whether a predetermined period of time has elapsed since the occupant last operated the display 17 or not based on an operation history of the display 17. The predetermined period of time herein is a threshold of such a period of time that the possibility that the occupant will perform another continuous operation since the occupant last operated the display 17 is reduced to a certain degree. When the predetermined period of time has not elapsed, it can be perceived that automatic displaying of surrounding situation images may give inconvenience to the occupant who tries to continuously perform another operation.

The display control unit 15 controls displaying of the display 17. The display control unit 15 causes the display 17 to automatically display a surrounding situation image according to the recognition result of the road width recognition unit 13.

Based on at least the width of the road and the vehicle speed of the vehicle 1, the display control unit 15 causes the display 17 to display a surrounding situation image when the vehicle speed is equal to or less than a predetermined vehicle speed threshold and a predetermined narrow path condition is satisfied.

The vehicle speed threshold is a threshold of the vehicle speed for determining whether to cause the display 17 to automatically display a surrounding situation image or not. The vehicle speed threshold can be a predetermined vehicle speed (for example, about 20 km/h) corresponding to a result of the vehicle 1 being hindered from smooth traveling and decelerated due to the fact that the substantial width of the road on which the vehicle 1 is traveling is narrow. "The substantial width of the road is narrow" includes not only the fact that the width of the road itself is narrow but also the fact that, even when the width of the road itself has a margin, the width dimension through which the vehicle 1 can pass is narrow due to the presence of at least one of an oncoming vehicle and an obstacle. Situations when the vehicle speed is equal to or less than the vehicle speed threshold can be considered as the situations that the driver of the vehicle 1 decelerates the vehicle 1 and pays attention to the situation around the vehicle 1. Therefore, it can be perceived that displaying of surrounding situation images is useful.

The predetermined narrow path condition is a condition that is for determining whether to cause the display 17 to automatically display a surrounding situation image or not and that is related to the substantial width of the road on which the vehicle 1 is traveling. The narrow path condition includes at least a condition related to the width of the road recognized based on the detection result of the vehicle-mounted external sensor 21 used for at least one of autonomous driving control and driving assistance control of the vehicle 1.

The narrow path condition is satisfied when the road is a predetermined extremely narrow path. The road being a predetermined extremely narrow path means that, for example, the width of the road is equal to or less than a predetermined extremely narrow path threshold. The extremely narrow path threshold is a threshold of the width of the road for determining whether or not the road is a road where traveling of the vehicle 1 is difficult even when neither an oncoming vehicle nor an obstacle is present. The extremely narrow path threshold may be a predetermined parameter of about 2 m to 3 m, and may be, for example, about 2.25 m.

The narrow path condition may be satisfied when the road is a predetermined narrow path wider than the predetermined extremely narrow path and at least one of an oncoming vehicle and an obstacle is present within the above-described distance threshold on the front side of the vehicle 1. The road being a predetermined narrow path may mean that, for example, the width of the road is larger than the above-described extremely narrow path threshold and equal to or less than a predetermined narrow path threshold. The narrow path threshold is a threshold of the width of the road for determining whether or not the road is a road where, even when the width of the road itself has a margin, traveling of the vehicle 1 is difficult due to the presence of at least one of an oncoming vehicle and an obstacle. The narrow path threshold may be a predetermined parameter of about 3 m to 7 m, and may be, for example, about 5.5 m.

The narrow path condition may be satisfied when the road is wider than the predetermined narrow path, the width of the road on the front side of the vehicle 1 decreases, and at least one of an oncoming vehicle and an obstacle is present within the above-described distance threshold on the front side of the vehicle 1. The situation where the width of the road on the front side of the vehicle 1 decreases means a situation where, even when the width of the road on which the vehicle 1 is currently traveling is sufficiently wide, as the vehicle 1 travels, the width of the road becomes one with which traveling of the vehicle 1 is difficult. Examples of the situation where the width of the road on the front side of the vehicle 1 decreases include a case where a width reduction sign is present on the front side of the vehicle 1. The display control unit 15 may use a result of recognition of objects around the vehicle 1 to recognize the presence of a width reduction sign on the front side of the vehicle 1. Examples of the situation where the width of the road on the front side of the vehicle 1 decreases include a case where there is map information that the width of the road on the front side of the vehicle 1 decreases. The display control unit 15 may, based on map information of the map database 22 and the vehicle position of the vehicle 1, recognize map information that the width of the road on the front side of the vehicle 1 decreases.

Figure 2A:
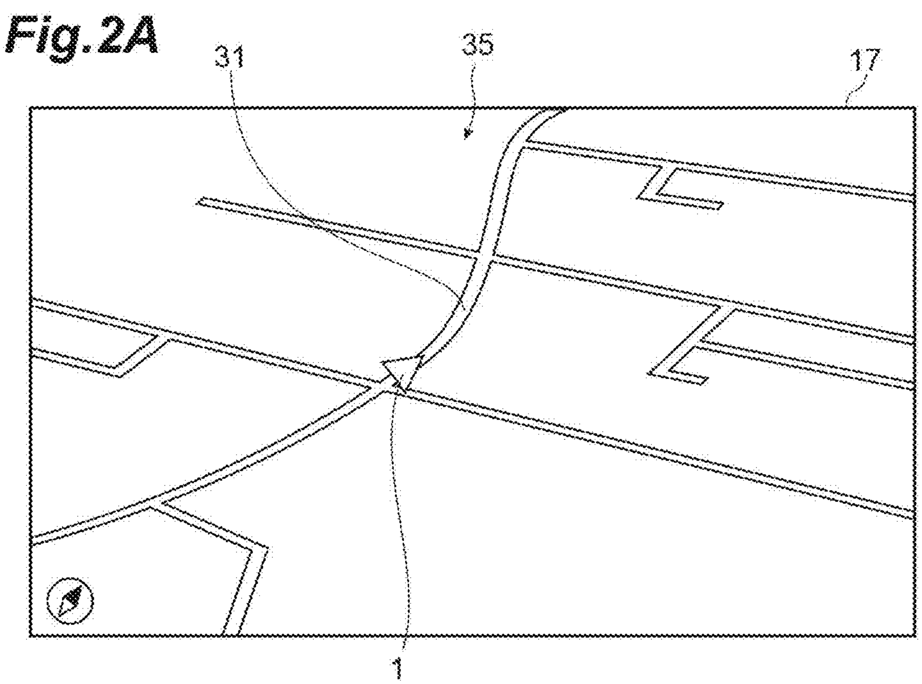
FIG. 2A is a diagram showing an example of a navigation image.

When the vehicle speed is larger than a predetermined vehicle speed threshold or a predetermined narrow path condition is not satisfied, the display control unit 15 may cause the display 17 to display a navigation image like that shown in FIG. 2A, for example. When the vehicle speed is equal to or less than a predetermined vehicle speed threshold and a predetermined narrow path condition is satisfied, the display control unit 15 may cause the display 17 to display a surrounding situation image like that shown in FIG. 2B, for example.

FIG. 2A is a diagram showing an example of a navigation image. FIG. 2A shows an example of a navigation image displayed on the display 17. When a predetermined condition for automatically displaying a surrounding situation image is not satisfied, the display control unit 15 may cause the display 17 to display a navigation image 35. In the navigation image 35, for example, an icon indicating the current position of the vehicle 1 and a road 31 on which the vehicle 1 is traveling are shown. The navigation image 35 may be an image showing a target route during navigation. The navigation image 35 may be an image showing a current position when navigation is not performed. When a predetermined condition for automatically displaying a surrounding situation image is not satisfied, the display control unit 15 may cause the display 17 to display content other than the navigation image 35. The content other than the navigation image 35 may be, for example, a navigation setting screen, a music setting screen, or other content such as moving images.

Figure 2B:
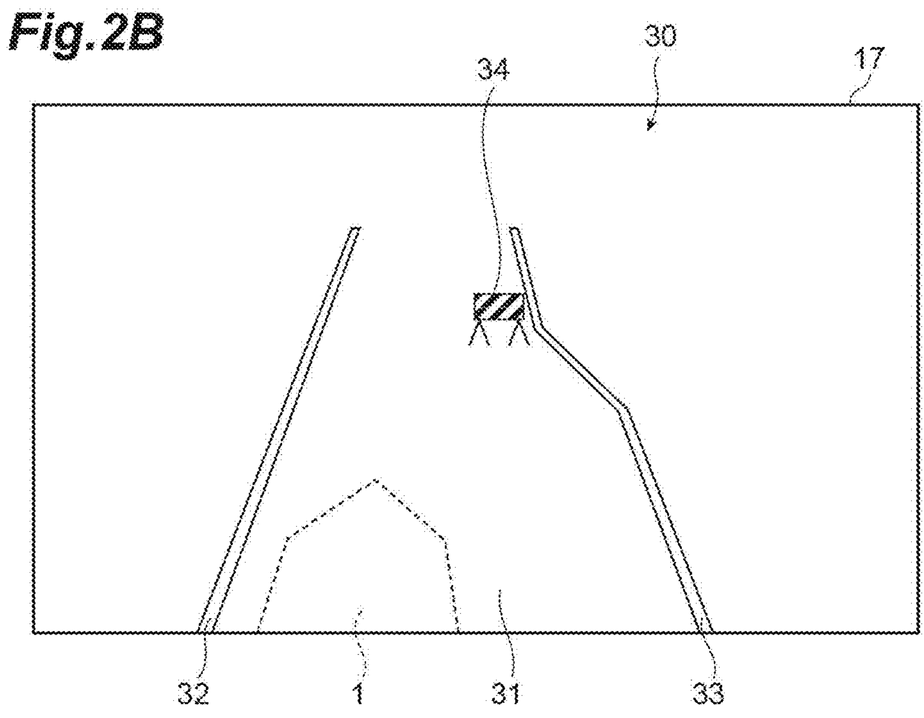
FIG. 2B is a diagram showing an example of a surrounding situation image.

FIG. 2B is a diagram showing an example of a surrounding situation image. In the example of FIG. 2B, the surrounding situation image is, for example, a rear bird's-eye view image in which the situation of the road 31 around the vehicle 1 is shown together with a virtual outline of the vehicle 1. The virtual outline of the vehicle 1 is an image virtually showing the outline of the vehicle 1 in the surrounding situation image. The virtual outline of the vehicle 1 may, for example as schematically shown by the broken line of FIG. 2B, be displayed corresponding to the current position of the vehicle 1 on the road 31 on which the vehicle 1 is currently traveling.

In the example of FIG. 2B, a lane line 32 and a lane line 33 extending along the road 31 in both end portions in the width direction of the road 31 are shown as a situation of the road 31 around the vehicle 1. Herein, the lane line 33 on the right side as viewed from the vehicle 1 is bent to approach the lane line 32 side on the front side of the vehicle 1. A barricade 34 is present within a predetermined distance threshold on the front side of the vehicle 1. That is, FIG. 2B corresponds to a case where the road 31 is wider than a predetermined narrow path, the width of the road 31 on the front side of the vehicle 1 decreases, and at least one of an oncoming vehicle and an obstacle is present within a predetermined distance threshold on the front side of the vehicle 1. The display mode of the surrounding situation image is not limited to the example of FIG. 2B.

The display control unit 15 may stop automatic displaying of surrounding situation images on the display 17 based on the occupant state of the vehicle 1 recognized from a captured image of the in-vehicle camera 16. For example, when the vehicle speed is equal to or less than a predetermined vehicle speed threshold and a predetermined narrow path condition is satisfied, when the occupant is gazing at the display 17, the display control unit 15 may keep the display 17 from displaying a surrounding situation image. When the vehicle speed is equal to or less than a predetermined vehicle speed threshold and a predetermined narrow path condition is satisfied, when a predetermined period of time has not elapsed since the occupant last operated the display 17, the display control unit 15 may keep the display 17 from displaying a surrounding situation image.

[Processing of Display Device]

Next, an example of processing of the display device 100 is described with reference to the flowcharts of FIG. 3 and FIG. 4. FIG. 3 is a flowchart showing a processing example of a display control ECU of the display device. The processing shown in FIG. 3 is, for example, repeatedly executed at every predetermined calculation cycle during traveling of the vehicle 1.

As shown in FIG. 3, in S11, the display control ECU 10 of the display device 100 uses the surrounding situation recognition unit 11, the traveling state recognition unit 12, and the road width recognition unit 13 to perform capture of a surrounding situation image and recognition of the vehicle speed of the vehicle 1 and the width of the road. The surrounding situation recognition unit 11 acquires a surrounding situation image captured by a camera of the external sensor 21. The traveling state recognition unit 12 uses, for example, the detection result of the internal sensor 23 to recognize the vehicle speed of the vehicle 1 as a traveling state of the vehicle 1. The road width recognition unit 13 uses, for example, the detection result of the external sensor 21 to recognize the width of the road on which the vehicle 1 is currently traveling.

In S12, the display control ECU 10 uses the surrounding situation recognition unit 11 to perform recognition of objects around the vehicle 1. The surrounding situation recognition unit 11 uses, for example, the detection result of the external sensor 21 to recognize an oncoming vehicle, an obstacle, or the like as an object around the vehicle 1.

In S13, the display control ECU 10 uses the occupant state recognition unit 14 to perform recognition of the state of the occupant of the vehicle 1. The occupant state recognition unit 14 uses, for example, a captured image of the in-vehicle camera 16 to recognize whether the occupant is gazing at the display 17 or not, as a state of the occupant of the vehicle 1. The occupant state recognition unit 14 uses, for example, an operation history of the display 17 to recognize whether a predetermined period of time has elapsed since the occupant last operated the display 17 or not, as a state of the occupant of the vehicle 1.

In S14, the display control ECU 10 uses the display control unit 15 to determine whether the vehicle speed is equal to or less than a vehicle speed threshold or not. When the vehicle speed is equal to or less than the vehicle speed threshold (S14: YES), the display control unit 15 proceeds to the processing of S15, for example. On the other hand, when the vehicle speed is larger than the vehicle speed threshold (S14: NO), the display control ECU 10 proceeds to the processing of S19 described later.

In S15, the display control ECU 10 uses the display control unit 15 to determine whether a predetermined narrow path condition is satisfied or not. The display control unit 15 performs, for example, the processing of FIG. 4 as determination processing of S15. FIG. 4 is a flowchart showing an example of narrow path condition determination processing of FIG. 3. The processing of FIG. 4 is executed along with the execution of the processing of FIG. 3.

As shown in FIG. 4, in S21, the display control ECU 10 uses the display control unit 15 to determine whether the road is a predetermined narrow path or not. For example, when the width of the road is equal to or less than a predetermined narrow path threshold (for example, 5.5 m), the display control unit 15 determines that the road is a predetermined narrow path. When the width of the road is larger than the predetermined narrow path threshold, the display control unit 15 determines that the road is not the predetermined narrow path.

When the display control ECU 10 has determined that the road is a predetermined narrow path (S21: YES), in S22 the display control ECU 10 uses the display control unit 15 to determine whether the road is a predetermined extremely narrow path or not. For example, when the width of the road is equal to or less than a predetermined extremely narrow path threshold (for example, 2.25 m), the display control unit 15 determines that the road is a predetermined extremely narrow path. When the width of the road is larger than the predetermined extremely narrow path threshold, the display control unit 15 determines that the road is not a predetermined extremely narrow path.

When the display control ECU 10 has determined that the road is a predetermined extremely narrow path (S22: YES), in S23 the display control ECU 10 uses the display control unit 15 to determine that the predetermined narrow path condition is satisfied. After that, the display control ECU 10 ends the processing of FIG. 4, and proceeds to the processing of S16 of FIG. 3.

On the other hand, when the display control ECU 10 has determined that the road is a predetermined narrow path (S21: YES) and that the road is not a predetermined extremely narrow path (S22: NO), in S24 the display control ECU 10 uses the display control unit 15 to determine whether at least one of an oncoming vehicle and an obstacle is present within a predetermined distance threshold on the front side of the vehicle 1 or not. The display control unit 15 uses, for example, a result of recognition of objects around the vehicle 1 to determine whether at least one of an oncoming vehicle and an obstacle is present within a predetermined distance threshold on the front side of the vehicle 1 or not.

When at least one of an oncoming vehicle and an obstacle is present within the predetermined distance threshold on the front side of the vehicle 1 (S24: YES), the display control unit 15 proceeds to the processing of S23 described above, and determines that the predetermined narrow path condition is satisfied. After that, the display control ECU 10 ends the processing of FIG. 4, and proceeds to the processing of S16 of FIG. 3. On the other hand, when neither an oncoming vehicle nor an obstacle is present within the predetermined distance threshold on the front side of the vehicle 1 (S24: NO), the display control ECU 10 proceeds to the processing of S26 described later.

On the other hand, when the display control ECU 10 has determined that the road is not a predetermined narrow path (S21: NO), in S25 the display control ECU 10 uses the road width recognition unit 13 to determine whether the width of the road on the front side of the vehicle 1 decreases or not. For example, the road width recognition unit 13 uses a result of recognition of objects around the vehicle 1, and when the result indicates that there is a width reduction sign on the front side of the vehicle 1, determines that the width of the road on the front side of the vehicle 1 decreases. The road width recognition unit 13 may, when map information that the width of the road on the front side of the vehicle 1 decreases is obtained based on map information of the map database 22 and the vehicle position of the vehicle 1, determine that the width of the road on the front side of the vehicle 1 decreases.

When the display control ECU 10 has determined that the width of the road on the front side of the vehicle 1 decreases (S25: YES), the display control ECU 10 proceeds to the processing of S24 described above. On the other hand, when the display control ECU 10 has determined that the width of the road on the front side of the vehicle 1 does not decrease (S25: NO), in S26 the display control ECU 10 uses the display control unit 15 to determine that the predetermined narrow path condition is not satisfied. After that, the display control ECU 10 ends the processing of FIG. 4, and proceeds to the processing of S16 of FIG. 3.

Returning to FIG. 3, in S16, the display control ECU 10 uses the display control unit 15 to determine whether the occupant is not gazing at the display unit or not. When the occupant is not gazing at the display 17 (S16: YES), the display control unit 15 proceeds to the processing of S17, for example. On the other hand, when the occupant is gazing at the display 17 (S16: NO), the display control ECU 10 proceeds to the processing of S19 described later.

In S17, the display control ECU 10 uses the display control unit 15 to determine whether a predetermined period of time has elapsed since the operation of the display unit or not. When the predetermined period of time has elapsed since the occupant last operated the display 17 (S17: YES), the display control unit 15 proceeds to the processing of S18, for example. On the other hand, when the predetermined period of time has not elapsed since the occupant last operated the display 17 (S17: NO), the display control ECU 10 proceeds to the processing of S19 described later.

In S18, the display control ECU 10 uses the display control unit 15 to cause the display unit to display a surrounding situation image. For example, the display control unit 15 causes the display 17 to display a surrounding situation image like that shown in FIG. 2B. After that, the display control ECU 10 ends the processing of FIG. 3.

On the other hand, in S19, the display control ECU 10 uses the display control unit 15 to keep the display unit from displaying a surrounding situation image. For example, the display control unit 15 causes the display 17 to display a navigation image like that shown in FIG. 2A. After that, the display control ECU 10 ends the processing of FIG. 3.

The processing of S19 performed after the surrounding situation image is displayed on the display 17 by the processing of S18 means the automatic termination of the display of the surrounding situation image. The processing of ending of displaying of surrounding situation images may be performed in response to a manual operation by the occupant, such as a touch panel operation on the display 17.

In the display device 100 described hereinabove, when the vehicle speed is equal to or less than a predetermined vehicle speed threshold and a predetermined narrow path condition is satisfied, the display 17 is caused to display a surrounding situation image 30. The predetermined narrow path condition is satisfied according to the width of the road recognized based on the detection result of the vehicle-mounted external sensor 21 used for at least one of autonomous driving control and driving assistance control of the vehicle 1. Since whether the predetermined narrow path condition is satisfied or not is determined using the width of the road recognized more directly, a surrounding situation image 30 can be automatically displayed on the display 17 in a more appropriate situation than when, for example, map information of a navigation device is mainly used.

The display device 100 includes a surrounding situation recognition unit (surrounding object recognition unit) 11 that recognizes an object around the vehicle 1 based on the detection result of the external sensor 21. The narrow path condition is satisfied when the road is a predetermined extremely narrow path or when the road is a predetermined narrow path wider than the predetermined extremely narrow path and at least one of an oncoming vehicle and an obstacle is present within a predetermined distance threshold on the front side of the vehicle 1. Thereby, a surrounding situation image 30 can be automatically displayed on the display 17 in a situation of a road where traveling of the vehicle 1 is difficult even when neither an oncoming vehicle nor an obstacle is present. Alternatively, a surrounding situation image 30 can be automatically displayed on the display 17 in a situation of a road where, even when the width of the road itself has a margin, traveling of the vehicle 1 is difficult due to the presence of at least one of an oncoming vehicle and an obstacle.

The display device 100 includes a surrounding situation recognition unit 11 that recognizes an object around the vehicle 1 based on the detection result of the external sensor 21. The narrow path condition is satisfied when the road is wider than a predetermined narrow path, the width of the road on the front side of the vehicle 1 decreases, and at least one of an oncoming vehicle and an obstacle is present within a predetermined distance threshold on the front side of the vehicle 1. Thereby, a surrounding situation image 30 can be automatically displayed on the display 17 in a situation where, even when the width of the road on which the vehicle 1 is currently traveling is sufficiently wide, as the vehicle 1 travels, the width of the road becomes narrow enough to make traveling difficult for the vehicle 1.

The display device 100 includes an occupant state recognition unit 14 that recognizes the state of an occupant of the vehicle 1 based on a captured image of an in-vehicle camera 16 that captures an image of an occupant of the vehicle 1. When the vehicle speed is equal to or less than a predetermined vehicle speed threshold and a predetermined narrow path condition is satisfied, when the occupant is gazing at the display 17, the display control unit 15 keeps the display 17 from displaying a surrounding situation image 30. Thereby, for example, when an occupant is gazing at the display 17 in order to view content other than a surrounding situation image 30, inconvenience that would be given to the occupant by causing the display 17 to display a surrounding situation image 30 can be suppressed.

Hereinabove, embodiments of the present disclosure are described, however, the present disclosure is not limited to the above embodiments.

Although in the above embodiment the following three examples are shown as cases where the predetermined narrow path condition is satisfied, these examples are not essential.

(1) When the road is a predetermined extremely narrow path (S22 of FIG. 4: YES)

(2) When the road is a predetermined narrow path wider than the predetermined extremely narrow path and at least one of an oncoming vehicle and an obstacle is present within a predetermined distance threshold on the front side of the vehicle (S22 of FIG. 4: NO, and S24 of FIG. 4: YES)

(3) When the road is wider than the predetermined narrow path, the width of the road on the front side of the vehicle decreases, and at least one of an oncoming vehicle and an obstacle is present within a predetermined distance threshold on the front side of the vehicle (S21 of FIG. 4: NO, S25 of FIG. 4: YES, and S24 of FIG. 4: YES)

For example, the condition of whether the width of the road on the front side of the vehicle decreases or not (S25 of FIG. 4) and the condition of whether at least one of an oncoming vehicle and an obstacle is present within a predetermined distance threshold on the front side of the vehicle or not (S24 of FIG. 4) may be omitted.

Although in the above embodiment the display device 100 includes an in-vehicle camera 16, this example is not essential. For example, when the function of keeping the display 17 from displaying a surrounding situation image 30 when the occupant is gazing at the display 17 (the processing of S16 of FIG. 3) is omitted in the display control unit 15, the in-vehicle camera 16 may be omitted.

Although in the above embodiment the display 17 is kept from displaying a surrounding situation image 30 when a predetermined period of time has not elapsed since the occupant last operated the display 17, this example is not essential. The processing of S17 of FIG. 3 may be omitted.

Although in the above embodiment FIG. 2B is shown as an example of a surrounding situation image displayed on the display unit, the surrounding situation image is not limited to this example. This example is an image of a surrounding situation corresponding to "the case of S21: NO, S25: YES, and S24: YES" in FIG. 4. Examples of other surrounding situation images include an image of a surrounding situation corresponding to another case such as one leading to S23 of FIG. 4.

Although in the above embodiment the vehicle 1 is equipped with an autonomous driving system 2 and autonomous driving control of the vehicle 1 can be executed, the configuration is not limited to this example. For example, the vehicle may be equipped with a driving assistance system and capable of executing driving assistance control. That is, the vehicle-mounted external sensor needs only to be a sensor used for at least one of autonomous driving control and driving assistance control of the vehicle.

Although in the above embodiment the display control ECU 10 is configured to acquire some information via the autonomous driving ECU 20, the configuration is not limited to this example. The display control ECU 10 may recognize a surrounding situation image, the width of the road, the vehicle speed of the vehicle 1, etc. by the display control ECU 10 itself without using the recognition result of the autonomous driving ECU 20. In this case, the external sensor 21, the map database 22, the internal sensor 23, and the GNSS receiver 24 for recognizing the above items may be connected to the display control ECU 10.

What is claimed is:

1. A display device comprising:

a road width recognition unit configured to recognize a width of a road on which a vehicle is traveling based on a detection result of a vehicle-mounted external sensor used for at least one of autonomous driving control or driving assistance control of the vehicle including a camera, the camera being configured to capture a surrounding situation image showing a situation around the vehicle;

an occupant state recognition unit configured to recognize a state of an occupant of the vehicle based on a captured image of an in-vehicle camera configured to capture an image of the occupant of the vehicle;

a display control unit configured to cause a vehicle-mounted display unit to display the surrounding situation image; and a surrounding object recognition unit configured to recognize an object around the vehicle based on a detection result of the external sensor, wherein the display control unit is configured to cause the display unit to display the surrounding situation image in response to a vehicle speed of the vehicle being equal to or less than a predetermined vehicle speed threshold and a predetermined narrow path condition being satisfied, based on at least the width of the road and the vehicle speed, and in response to the state recognized by the occupant state recognition unit indicating that the occupant is gazing at the display unit, keep the display unit from displaying the surrounding situation image even when the vehicle speed is equal to or less than the predetermined vehicle speed threshold and the predetermined narrow path condition is satisfied, and the predetermined narrow path condition is satisfied in response to the road being wider than a predetermined narrow path, a width of the predetermined narrow path being larger than a predetermined further narrow path threshold and equal to or less than a predetermined narrow path threshold, the width of the road on a front side of the vehicle decreasing in a case that a width reduction sign is present on the front side of the vehicle or in a case that map information indicating that the width of the road on the front side of the vehicle decreases, and at least one of an oncoming vehicle or an obstacle being present within a predetermined distance threshold on the front side of the vehicle.

2. The display device according to claim 1, the predetermined narrow path condition is satisfied in response to the road being a predetermined further narrow path and a width of the predetermined further narrow path being equal to or less than the predetermined further narrow path threshold, or in response to the road being the predetermined narrow path wider than the predetermined further narrow path, a width of the predetermined narrow path being larger than the predetermined further narrow path threshold and equal to or less than the predetermined narrow path threshold, and at least one of an oncoming vehicle or an obstacle being present within a predetermined distance threshold on a front side of the vehicle.

3. The display device according to claim 1, wherein the predetermined narrow path condition is satisfied in response to the road being wider than the predetermined narrow path, the width of the predetermined narrow path being larger than the predetermined further narrow path threshold and equal to or less than the predetermined narrow path threshold, the width of the road on the front side of the vehicle decreasing, and at least one of the oncoming vehicle or the obstacle being present within the predetermined distance threshold on the front side of the vehicle.

* * * * *